Figure 1:
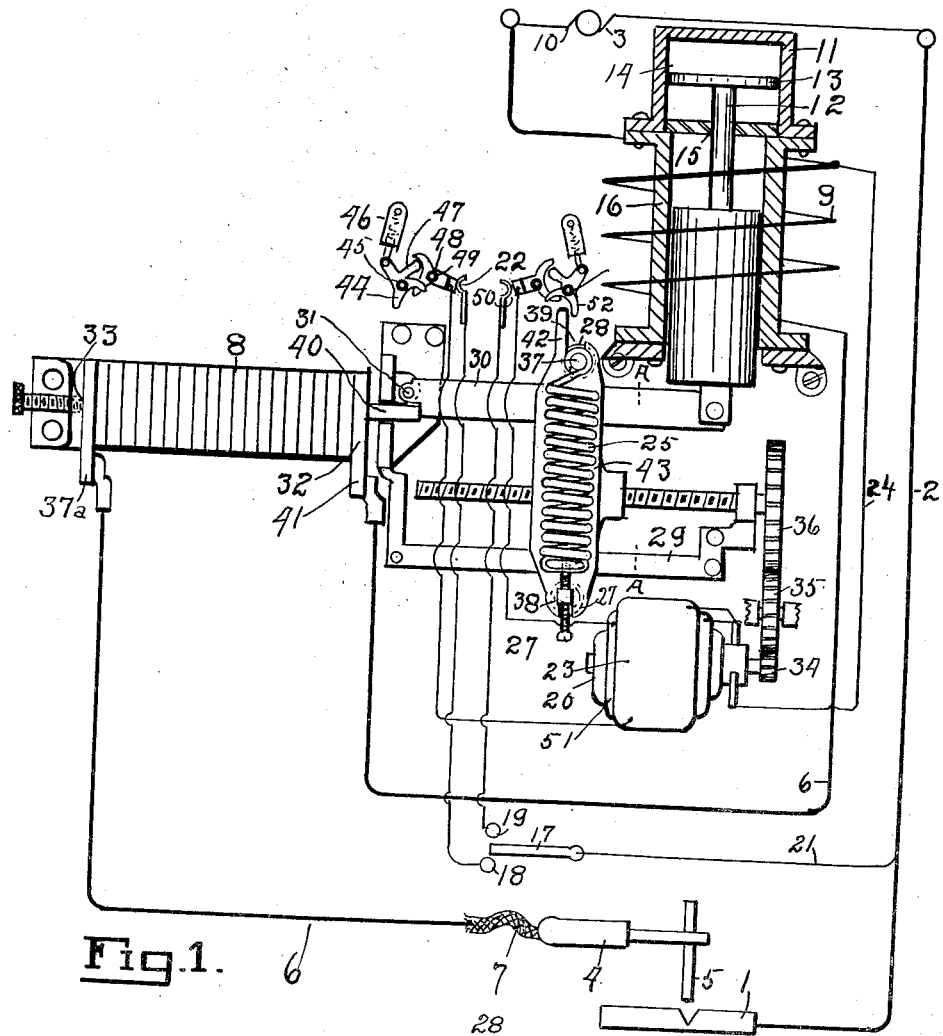

D. H. WILSON.
SYSTEM OF ELECTRIC WELDING.
APPLICATION FILED MAY 1, 1915. RENEWED MAY 10, 1916.

1,187,409.

Patented June 13, 1916.

WITNESSES:
Gladys Ford

INVENTOR.
David H. Wilson
BY Myron F. Hill
ATTORNEYS.

UNITED STATES PATENT OFFICE.

DAVID H. WILSON, OF PATERSON, NEW JERSEY.

SYSTEM OF ELECTRIC WELDING.

1,187,409.  Specification of Letters Patent.  Patented June 13, 1916.

Application filed May 1, 1915, Serial No. 25,180. Renewed May 10, 1916. Serial No. 96,536.

*To all whom it may concern:*

Be it known that I, DAVID H. WILSON, a citizen of the United States, and resident of Paterson, in the county of Passaic and State of New Jersey, have invented certain new and useful Improvements in the System of Electric Welding, of which the following is a specification.

My invention relates to the art of electric welding with an arc and preferably in which a metal electrode is composed of welding metal, the same being transferred across the arc to the work operated upon.

The object of my invention is the elimination of unnecessary initial resistance in the circuit and the general simplification of the apparatus.

It has been customary to perform electric welding operations with a current of such a potential that when the welding terminals are brought into contact there would be a rush of current causing a spattering of metal if the circuit was not provided with a resistance to prevent the rush. Since such a resistance in the circuit interferes with the welding operations, it has been customary to reduce the resistance or cut it out of circuit as the arc is drawn.

My invention contemplates the use of a constant potential current that is of sufficient potential and volume to create an arc but which is of such a low potential as to render an initial resistance in the circuit unnecessary. I have found by experience that the ordinary resistance between the contacting terminals is sufficient to prevent a rush of current if the potential is kept down to a sufficiently low point. I have discovered, for example, that a current having a line voltage of 30 or 35 will not cause a detrimental rush of current when the welding terminals are brought into contact so that my welding circuit has practically no initial resistance other than ordinary circuit connections and the whole force of the current performs a useful function in sufficiently heating the welding terminals to permit the rapid drawing of the arc. Since it is desirable after drawing the arc to cut down the amperage of the current to the requirements of the particular piece or work in hand and also to prevent the terminals from sticking together, a resistance is introduced into the circuit automatically upon establishing the flow of the welding current. Introducing the resistance is preferably delayed however until after the arc has been well drawn. Time controlled means are preferably employed to delay the introduction of the resistance until after the arc has been drawn.

My invention contemplates further a carbon pile capable of delicate and gradual regulation, for the purpose of providing an even current at the arc.

It relates further to means by which the average or normal resistance of the pile may be adjusted at the will of the operator to provide a greater or smaller welding current in accordance with the demands of his work.

It consists further in means to enable the operator to adjust the normal resistance of the pile from the place where his work is located.

It consists further in automatic stops to prevent the adjusting devices of the carbon pile structure from being carried to injurious limits.

My invention also contains means to render regulation smoother and with less interference from the momentum of rapidly vibrating mechanical parts.

Figure 2:
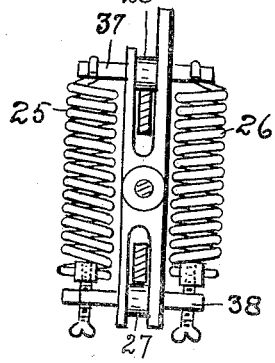

In the drawings: Figure 1 shows a view of the carbon pile, circuits and apparatus designed to carry into effect the various objects named above. Fig. 2 is a section of Fig. 1 on line A—A.

In Fig. 1 is shown a piece of metal 1, constituting the work. This piece of metal may be fractured as shown; and it may be part of a boiler or other piece of mechanism or apparatus intended for repair. It may represent a part intended for joining in a manufacturing process, or it may be any material to which my invention may be applied. This piece of metal 1, is connected through the conductor 2 to the source of welding current 3 which may, for example, be the negative pole of a bipolar generator. The tool holder 4 is adapted to have secured to it a metal electrode 5, which may be of any suitable steel or alloy, in electrical connection with the conductor 6, which may be a cable as indicated at 7. This conductor 6 is connected through the main regulating pile 8 and solenoid 9 to the positive pole 10 of the generator.

The operation of the solenoid 8 is delayed and dampened by the dash-pot 11. To the core of the solenoid is secured a rod 12 at the other end of which is fixed a plate 13 fitting freely within the cylinder 14, forming the dash pot. The rod 12 passes through the bearing 15 of the dash pot, which, as shown, may be mounted on the top of the solenoid spool 16 and secured thereto by any suitable means. Any other suitable device may be used to affect the action of the solenoid. The object of this delay is to maintain the circuit of the carbon pile at a low resistance until the operator has had an opportunity to separate the welding tool 5 from the work 1. During the drawing of the arc or soon after, the solenoid overcomes the dash pot and increases the resistance up to the requirements of the welding arc. It is thus apparent that when the electrode 5 is brought into contact with the metal work 1, the circuit established from the sources of electric current 3 and 10 over the circuits above described permits the passage first of an amount of current sufficient to establish the desired arc. The current is then reduced after the terminals become heated, the pile resistance being increased for the purpose. It may preferably be adjusted by the operator (or anybody else) to supply a variable amount of current from say, 200 amperes, down to any amount, say 25, that may be desired by the operator. In order that he may select the amount of current he desires, the operator is provided with a switch having an arm 17 adapted to come into contact with either one of the two contacts 18 or 19. If the operator closes the circuit from the switch arm 17 to the contact 18, he selects the desired normal resistance of the pile by operating the motor 20 in the following circuit: source of current 3, conductors 2 and 21, switch 17, contact 18, circuit closer 22, field coil 23 of the motor, the armature of the motor, conductor 24, to the terminal 10. This circuit causes the motor to rotate in such a direction as to advance springs 25 and 26 or other resilient means, to the left in the figure so that the rollers 27 and 28 travel toward the pile 8; the roller 27 traveling upon the fixed track 29 and the roller 28 upon the lever 30 (which is fulcrumed upon the fixed pivot 31 and engages the end 32 of the pile 8) so that the spring exerts a lessened compression upon the pile against the adjustable fixed abutment 33, thereby increasing the resistance of the pile. The full spring pressure may reduce the resistance of the pile to substantially zero. As the pressure is counteracted or reduced, the resistance of the pile may be increased accordingly.

In this apparatus the motor 20 is provided with a pinion 34, engaging the gear wheels 35 and 36 causing the latter to travel as described. The springs 25 and 26 are fastened to the journals 37 and 38 of the rollers, tending to pull them toward each other. The upper journal 37 is adapted to freely slide in the slots 39 so that the roller is adapted to exert a fairly constant pressure upon the lever 30 and a varying pressure upon the pile. This lever is fulcrumed at 31 and presses against the post 40 of the end plate 41 of the pile. The plate exerts a pressure upon the pile, pressing the various disks of the pile into close engagement. From this construction, it will be seen that the operator in closing the switch lever 17 to the contact 18 may cause the springs 25 and 26 to be carried along the lever 30, so that while its tension or pull is not greatly altered, its effect upon the pile is greatly altered. In this way the operator is enabled to vary the amount of current supplied through the pile. If the operator leaves the switch 17 in engagement with the contact 18 too long, the lug 42 upon the carrier 43 engages an automatic circuit breaking lever 44 pivoted at 45 and properly located and switches it to the left against the compression spring 46 until the pressure of the spring is exerted in a direction to the right of the pivot 45 thus throwing the lever over. This causes the arm 47 to engage lever 48 pivoted at 49 and causes it to break the circuit between the contacts 22, so that the motor 20 stops working. When the operator desires more current for his work, he shifts the lever 17 to the contact 19, thereby switching the current from the winding 23 of the field of the motor through the contacts 50 to the winding 51 of the fields of the motor, causing the motor to rotate in the opposite direction. The motor now operates the traveler 43 to the right and causes the springs 25 and 26 to increase the pressure upon the pile, thereby reducing its resistance and increasing the current therethrough. To prevent the operator from damaging the construction by a too prolonged operation of the motor, the lug 42 engages the lever 52, thereby opening the pair of contacts 50 thereby opening the circuit of the motor and stopping its action. When the motor is reversed, the lug 42 engages the opposite arms of the levers 52 and 44, thereupon closing the circuits at 22 or 50 as the case may be. After the operator has adjusted the carbon pile in order to supply the tool with the average quantity of current desired for his work, the main regulating solenoid 9 maintains the current so that it is substantially even at all times. The operator may adjust the pressure upon the pile so that at all times the disks of the pile are in such intimate contact with each other as to avoid sparking or injurious heating. If the carbon disks should not make uniform contact throughout their surfaces, there would result a detrimental local heating at the points of contact. The more uniform the contact is throughout the area of the disks, the greater the amount of current which can pass through the disks without injurious heating and the less the consumption of the pile and the greater its life. I have found it desirable to employ a substantial pressure upon the disks as a minimum pressure, and to vary the same to a substantially high pressure.

Since the momentum of the lever, solenoid, core and other mechanical parts during rapid oscillation would cause them to overthrow, thereby increasing or decreasing the resistance too much for best results, some means is desirable to dampen their action to secure the more accurate regulation. The dash pot in performing this function adds a very desirable element to a welding panel.

The spring pressure upon the lever, which transfers the pressure to the carbon pile, may, if desired, be fifty pounds or more. As the spring travels away from or toward the fulcrum, the pressure upon the pile tends to be correspondingly varied. When the solenoid is energized, the pressure upon the disks is affected to an extent determined by the amount of current flowing through the solenoid winding. The pressure of the spring action upon the pile, however, is not entirely removed, since the solenoid action is never strong enough to overcome the full force of the traveling spring. I do not limit my invention to these specific pressures for various other pressures may be employed, all depending upon the amount of current to be accommodated and the capacity of the pile. The object of the construction just referred to is to keep the disks of the pile in such intimate or uniform contact throughout their surfaces as to prevent injurious heating under all conditions of use. If the resistance at the arc increases, due to the uncertainty of the operator's manipulation of the tool, it causes a reduction of the flow of current through the solenoid, which exerts smaller pull upon its core resulting in a lighter pull upon the outer end of the lever, so that the carbon pile is subjected to more compression from the springs 25 and 26. When, however, the resistance of the welding arc decreases, more current flows through the regulating solenoid 8 thereby reducing the current supplied therethrough to the tool. This regulating action takes place regardless of the particular location of the springs 25 and 26 with relation to the lever 30. In this way the average current traversing the welding arc is maintained uniform in its heating effect. When the operator breaks the circuit at the welding arc, the solenoid 8 releases its core, causing the pile resistance to be reduced to practically nothing which is equivalent to throwing the pile out of circuit.

The end plates 32 and 37ª may be copper or they may be carbon copper plated, or they may be any other suitable material.

When the terminals 1 and 5 are brought into contact, they are heated readily by the current employed and a substantial arc is drawn. The pile resistance is then increased as or after the terminals are separated, until the increasing resistance of the pile and of the arc regulate the desired current flow to the amount provided by the location of springs 25 and 26 and the solenoid pull. This amount is subject to variation by the switch 17 and motor 20 as heretofore described. While the pile is normally in the electric circuit, its resistance is so low as to be negligible, and for all practical purposes at the moment when the terminals are brought into contact the pile might just as well be entirely out of circuit. The contact resistance is enough with the low voltage current employed, to prevent an objectionable flow of current.

Many of the features described may be varied without departing from the spirit of my invention.

What I claim is:

1. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations, intermediate means acted on by said electro-responsive device and acting upon said variable resistance to effect its resistance variations and means to render the action of said intermediate means sluggish.

2. In combination, in an arc welding system, a pair of welding terminals, one adapted to be manually operated to establish an arc, a variable resistance, variable by pressure adapted to maintain a smooth current flow by varying the resistance of the circuit, excluding the arc, in inverse proportion to the arc resistance, an electro-responsive device controlling said variations, intermediate means acted on by said electro-responsive device and acting upon said variable resistance to effect its resistance variations and means to render the action of said intermediate means sluggish.

3. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations subject to the full welding current, intermediate means acted on by said electro-responsive device and acting upon said variable resistance to effect its resistance variations and means to render the action of said intermediate means sluggish.

4. In combination, in an arc welding system, a pair of welding terminals, one adapted to be manually operated to establish an arc, a variable resistance, adapted to maintain a smooth current flow by varying the resistance of the circuit, excluding the arc, in inverse proportion to the arc resistance, an electro-responsive device controlling said variations in series with said resistance, intermediate means acted on by said electro-responsive device and acting upon said variable resistance to effect its resistance variations, and means to render the action of said intermediate means sluggish.

5. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations in series with said resistance and arc, intermediate means acted on by said electro-responsive device and acting upon said variable resistance to effect its resistance variations and means to render the action of said intermediate means sluggish.

6. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations, intermediate means acted on by said electro-responsive device and acting upon said variable resistance to effect its resistance variations, means to vary the proportional effect of said intermediate means with relation to said electro-responsive device and means to render the action of said intermediate means sluggish.

7. In combination, in an arc welding system, a pair of welding terminals, one adapted to be manually operated to establish an arc, a variable resistance variable by pressure, adapted to maintain a smooth current flow by varying the resistance of the circuit, excluding the arc, in inverse proportion to the arc resistance, an electro-responsive device controlling said variations, intermediate means acted on by said electro-responsive device and acting upon said variable resistance to effect its resistance variations, means to vary the proportional effect of said intermediate means with relation to said electro-responsive device, and means to render the action of said intermediate means sluggish.

8. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations, subject to the full welding current, intermediate means acted on by said electro-responsive device and acting upon said variable resistance to effect its resistance variations, means to vary the proportional effect of said intermediate means with relation to said electro-responsive device and means to render the action of said intermediate means sluggish.

9. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations in series with said resistance and arc, intermediate means acted on by said electro-responsive device and acting upon said variable resistance to effect its resistance variations, means to vary the proportional effect of said intermediate means with relation to said electro-responsive device and means to render the action of said intermediate means sluggish.

10. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations in series with said arc, intermediate means acted on by said variable resistance to effect its resistance variations, means to vary the proportional effect of said intermediate means with relation to said electro-responsive device and means to render the action of said intermediate means sluggish.

11. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations, intermediate means acted on by said solenoid and acting upon said variable resistance to effect its resistance variations, means to vary the proportional effect of said intermediate means with relation to said electro-responsive device, and a dash pot, coupled to said intermediate means.

12. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations, intermediate means acted on by said electro-responsive device and acting upon said variable resistance to effect its resistance variations and a dash pot coupled to said intermediate means.

13. In combination, in an arc welding system, a pair of welding terminals, one adapted to be manually operated to establish an arc, a variable resistance adapted to maintain a smooth current flow by varying the resistance of the circuit, excluding the arc, in inverse proportion to the arc resistance, an electro-responsive device controlling said variations, intermediate means acted on by said electro-responsive device and acting upon said variable resistance to effect its resistance variations and a dash pot coupled to said intermediate means.

14. In an electric arc welding system, a metallic electrode adapted to supply a welding metal through the arc to the work, a source of current therefor, of such low potential as to avoid an objectionable initial rush of current and spattering of metal, and means to increase the resistance of the welding circuit after the terminals are sufficiently heated.

15. In an electric arc welding system, a metallic electrode adapted to supply a welding metal through the arc to the work, a source of current therefor, of such low potential as to avoid an objectionable initial rush of current and spattering of metal, and means to increase the resistance of the welding circuit after the terminals are sufficiently heated, automatically operated by the establishment of the electric circuit through the welding terminals.

16. In an electric arc welding system, a metallic electrode adapted to supply a welding metal through the arc to the work, a source of current therefor, of such low potential as to avoid an objectionable initial rush of current and spattering of metal, means to increase the resistance of the welding circuit after the terminals are sufficiently heated, automatically operated by the establishment of the electric circuit through the welding terminals and time controlled means to retard the introduction of said resistance into said welding circuit.

17. In an electric arc welding system, a metallic electrode adapted to supply a welding metal through the arc to the work, a source of current therefor, of such low potential as to avoid an objectionable initial rush of current and spattering of metal, means to increase the resistance of the welding circuit after the terminals are sufficiently heated, automatically operated by the establishment of the electric circuit through the welding terminals and time controlled means to retard the introduction of said resistance into said welding circuit including a solenoid and carbon pile in series with the welding terminals.

18. In an electric arc welding system, a metallic electrode adapted to supply a welding metal across the arc to the work, a source of current therefor of such low potential as to avoid an objectionable initial rush of current and spattering of metal, means to increase the resistance of the welding circuit after the terminals are sufficiently heated and means to vary the amperage of said current at will.

19. In an electric arc welding system, a metallic electrode adapted to supply a welding metal across the arc to the work, a source of current therefor of such low potential as to avoid an objectionable initial rush of current and spattering of metal, means to vary the amperage of said current at will under the control of the operator adapted to be carried by the operator to any location in reach from the said electrode and flexible means to enable the electrode to be carried at will to any work location desired.

20. In an electric arc welding system, a metallic electrode adapted to supply a welding metal across the arc to the work, a source of current therefor of such low potential as to avoid an objectionable initial rush of current and spattering of metal, means to increase the resistance of the welding circuit after the terminals are sufficiently heated, automatically operated by the establishment of the electric circuit through the welding terminals and means to vary the amperage of said current at will.

21. In an electric arc welding system, a metallic electrode adapted to supply a welding metal across the arc to the work, a source of current therefor of such low potential as to avoid an objectionable initial rush of current and spattering of metal, means to increase the resistance of the welding circuit after the terminals are sufficiently heated, automatically operated by the establishment of the electric circuit across the welding terminals and time controlled means to retard the introduction of said resistance into said welding circuit and means to vary the amperage of said current at will.

22. In an electric arc welding system, a metallic electrode adapted to supply a welding metal across the arc to the work, a source of current therefor of such low potential as to avoid an objectionable initial rush of current and spattering of metal and means to vary the amperage of said current at will under the control of the operator including a device adapted to be carried by the operator with the said electrode.

23. In an electric arc welding system, two terminals, one of which is movable and adapted to draw an arc, and a low potential current supply adapted to supply a continuously low potential current for the purpose of establishing and maintaining the arc between said terminals.

24. In an electric arc welding system, two terminals, one of which is movable, and adapted to draw an arc, a low potential current supply adapted to supply a continuously low potential current for the purpose of establishing and maintaining the arc between said terminals and means to vary the amperage of said current at substantially a constant potential.

25. In combination, in an arc welding system, a source of current for welding, a pair of welding terminals, one of which is movable and between which an arc is adapted to be drawn, a resistance varying medium adapted to vary the resistance smoothly and gradually and electro-responsive means acting upon said resistance varying medium to vary the resistance of said medium inversely and proportionally to the variations of the arc resistance, the current supply for said arc having such a low potential as to avoid the initial rush and spattering of metal when the resistance of said resistance varying medium is excluded from the circuit.

26. In combination, in an arc welding system, a source of current for welding, a pair of welding terminals, one of which is movable and between which an arc is adapted to be drawn, a resistance varying medium adapted to vary the resistance smoothly and gradually and electro-responsive means acting upon said resistance varying medium to vary the resistance of said medium inversely and proportionally to the variations of the arc resistance, the potential of said source of current supply through said resistance varying medium to said arc being limited in its potential to such a degree as to prevent the drawing of a long, burning or slag forming arc.

27. In combination, in an arc welding system, a source of current for welding, a pair of welding terminals, one of which is movable and between which an arc is adapted to be drawn, a resistance varying medium adapted to vary the resistance smoothly and gradually and electro-responsive means acting upon said resistance varying medium to vary the resistance of said medium inversely and proportionally to the variations of the arc resistance, the current supply for said arc having such a low potential as to avoid the initial rush and spattering of metal when the resistance of said resistance varying medium is excluded from the circuit, the potential of said source of current supply through said resistance varying medium in said arc being limited in its potential to such a degree as to prevent the drawing of a long, burning or slag forming arc.

28. In combination, in an arc welding system, a source of current for welding, a pair of welding terminals, one of which is movable and between which an arc is adapted to be drawn, a resistance varying medium adapted to vary the resistance smoothly and gradually, electro-responsive means acting upon said resistance varying medium to vary the resistance of said medium inversely and proportionally to the variations of the arc resistance, the current supply for said arc having such a low potential as to avoid the initial rush and spattering of metal when the resistance of said resistance varying medium is excluded from the circuit and means to render the action of said resistance varying medium sluggish.

29. In combination, in an arc welding system, a source of current for welding, a pair of welding terminals, one of which is movable and between which an arc is adapted to be drawn, a resistance varying medium adapted to vary the resistance smoothly and gradually, electro-responsive means acting upon said resistance varying medium to vary the resistance of said medium inversely and proportionally to the variations of the arc resistance, the potential of said source of current supply through said resistance varying medium to said arc being limited in its potential to such a degree as to prevent the drawing of a long, burning or slag forming arc and means to vary the proportional effect of said resistance varying medium with relation to said electro-responsive device.

30. In combination, in an arc welding system, a source of current for welding, a pair of welding terminals, one of which is movable and between which an arc is adapted to be drawn, a resistance varying medium adapted to vary the resistance smoothly and gradually, electro-responsive means acting upon said resistance varying medium to vary the resistance of said medium inversely and proportionally to the variations of the arc resistance, the potential of said source of current supply through said resistance varying medium to said arc being limited in its potential to such a degree as to prevent the drawing of a long, burning or slag forming arc and means to vary the average amperage of the current from said source of current.

31. In combination, in an arc welding system, a source of current for welding, a pair of welding terminals, one of which is movable and between which an arc is adapted to be drawn, a resistance varying medium adapted to vary the resistance smoothly and gradually, electro-responsive means acting upon the resistance of said medium inversely and proportionally to the variation of the arc resistance, the potential of said source of current supply through said resistance varying medium to said arc being limited in its potential to such a degree as to prevent the drawing of a long, burning or slag forming arc and means to vary the average amperage of the current from said source of current, consisting of an electro-magnetic device and flexible electric connections combined with means adapted to be manually operated by the operator at his work to vary the said average amperage.

32. In combination, in an arc welding system, a source of current for welding, a pair of welding terminals, one of which is movable and between which an arc is adapted to be drawn, a resistance varying medium, and electro-responsive means acting upon said resistance varying medium to vary the resistance of said medium inversely and proportionally to the variations of the arc resistance, the current supply for said arc having such a low potential as to avoid the initial rush and spattering of metal when the resistance of said resistance varying medium is excluded from the circuit.

33. In combination, in an arc welding system, a source of current for welding, a pair of welding terminals, one of which is movable and between which an arc is adapted to be drawn, a resistance varying medium, and electro-responsive means acting upon said resistance varying medium to vary the resistance of said medium inversely and proportionally to the variations of the arc resistance, the potential of said source of current supply through said resistance varying medium to said arc being limited to such a degree as to prevent the drawing of a long, burning or slag forming arc.

34. In combination, in an arc welding system, a source of current for welding, a pair of welding terminals, one of which is movable and between which an arc is adapted to be drawn, a resistance varying medium and electro-responsive means acting upon said resistance varying medium to vary the resistance of said medium inversely and proportionally to the variations of the arc resistance, the current supply for said arc having such a low potential as to avoid the initial rush and spattering of metal when the resistance of said resistance varying medium is excluded from the circuit, the potential of said source of current supply through said resistance varying medium to said arc being also limited to such a degree as to prevent the drawing of a long, burning or slag forming arc.

35. In combination, in an arc welding system, a source of current for welding, a pair of welding terminals, one of which is movable and between which an arc is adapted to be drawn, a resistance varying medium, electro-responsive means acting upon said resistance varying medium to vary the resistance of said medium inversely and proportionally to the variations of the arc resistance, the potential of said source of current supply through said resistance varying medium to said arc being limited to such a degree as to prevent the drawing of a long, burning or slag forming arc and means to vary the average amperage of the current from said source of current.

36. In combination, in an arc welding system, a source of current for welding, a pair of welding terminals, one of which is movable and between which an arc is adapted to be drawn, a resistance varying medium in series with said arc, electro-responsive means acting upon said resistance varying medium to vary the resistance of said medium inversely and proportionally to the variations of the arc resistance, the potential of said source of current supply through said resistance varying medium to said arc being limited to such a degree as to prevent the drawing of a long, burning or slag forming arc.

37. In combination, in an arc welding system, a source of current for welding, a pair of welding terminals, one of which is movable and between which an arc is adapted to be drawn, a resistance varying medium in series with said arc, electro-responsive means acting upon said resistance varying medium to vary the resistance of said medium inversely and proportionally to the variations of the arc resistance, the potential of said source of current supply through said resistance varying medium to said arc being limited to such a degree as to prevent the drawing of a long, burning or slag forming arc.

38. In combination, in an arc welding system, a source of current for welding, a pair of welding terminals, one of which is movable and between which an arc is adapted to be drawn, a resistance varying medium in series with said arc, electro-responsive means acting upon said resistance varying medium to vary the resistance of said medium inversely and proportionally to the variations of the arc resistance, the potential of said source of current supply through said resistance varying medium to said arc being limited to such a degree as to prevent the drawing of a long, burning or slag forming arc, said electro-responsive device being located in series with said arc.

39. In combination, in an arc welding system, a source of current for welding, a pair of welding terminals, one of which is movable and between which an arc is adapted to be drawn, a resistance varying medium, electro-responsive means acting upon said resistance varying medium to vary the resistance of said medium inversely and proportionally to the variations of the arc resistance, the potential of said source of current supply through said resistance varying medium to said arc being limited to such a degree as to prevent the drawing of a long, burning or slag forming arc, said electro-responsive device being located in series with said resistance varying device.

40. In combination, in an arc welding system, a source of current for welding, a pair of welding terminals, one of which is movable and between which an arc is adapted to be drawn, a resistance varying medium in series with said arc, electro-responsive means acting upon said resistance varying medium to vary the resistance of said medium inversely and proportionally to the variations of the arc resistance, the potential of said source of current supply through said resistance varying medium to said arc being limited to such a degree as to prevent the drawing of a long, burning, or slag forming arc, said electro-responsive device being located in series with said arc and in series with said resistance varying device.

41. In combination, in an arc welding system, a source of current for welding, a pair of welding terminals, one of which is movable and between which an arc is adapted to be drawn, the potential of said source of current supply through said resistance varying medium to said arc being limited to such a degree as to prevent the drawing of a long, burning or slag forming arc.

42. In combination, in an arc welding system, a source of current for welding, a pair of welding terminals, one of which is movable and between which an arc is adapted to be drawn, the potential of said source of current supply through said resistance varying medium to said arc being limited to such a degree as to prevent the drawing of a long, burning or slag forming arc and means to vary the average amperage of the current from said source of current.

43. In an electric arc welding system, a pair of electrodes therefor, one of which is manually movable and adapted to draw and maintain an arc, a source of current therefor and means to limit the voltage of said current down to such a degree as will cause the arc to break substantially before it reaches a temperature that will burn the metal.

44. In an electric arc welding system, a pair of electrodes therefor, one of which is metallic and manually movable and adapted to draw and maintain an arc, a source of current therefor and means to limit the voltage of said current down to such a degree as will cause the arc to break substantially before it reaches a temperature that will burn the metal.

45. In an electric arc welding system, a pair of electrodes therefor, one of which is metallic and manually movable and adapted to draw and maintain an arc, a source of current therefor and means to limit the voltage of said current down to such a degree as will cause the arc to break substantially before it reaches a temperature that will burn the metal, and means to vary the amperage of said current at will.

46. In an electric arc welding system, two metallic electrodes, one consisting of work, a flexible connection between the permanent stationary conductor terminal and said electrode, the other electrode adapted to be manually manipulated by an operator for the purpose of drawing and maintaining an arc, means to continuously limit the current supplied to said electrodes down to such a degree as will cause the arc to break before reaching a metal burning and slag forming temperature, flexible means connecting said electrode with a permanent conductor terminal, and means to vary the amperage of the current including the variable resistance device located near said terminals.

47. In an electric arc welding system, two metallic electrodes, one consisting of work, a flexible connection between the permanent stationary conductor terminal and said electrode, the other electrode adapted to be manually manipulated by an operator for the purpose of drawing and maintaining an arc, means to continuously limit the current supplied to said electrodes down to such a degree as will cause the arc to break before reaching a metal burning and slag forming temperature, flexible means connecting said electrode with a permanent conductor terminal, means to vary the amperage of the current including the variable resistance device located near said terminals, and suitable switching apparatus adapted to be mounted by the operator to a distance and flexible connections between said switching apparatus and said variable resistance device.

48. In an electric welding system, two electrodes, one of which is manually operable and adapted to maintain an arc, automatic means to smoothly vary the resistance in said system to substantially compensate for the fluctuations of resistance in said arc, and means to dampen the said automatic means to prevent mechanical interference with said compensation.

Signed at New York in the county of New York and State of New York this 13th day of April, A. D. 1915.

DAVID H. WILSON.

Witnesses:
 Myron L. Hill,
 Gladys Ford.